(12) United States Patent
Schuppe et al.

(10) Patent No.: US 6,298,721 B1
(45) Date of Patent: Oct. 9, 2001

(54) CONTINUOUS LIQUID LEVEL MEASUREMENT SYSTEM

(75) Inventors: Alfred Schuppe, Columbus; Dean H. Dringenburg; Matthew L. Schneider, both of Seymour; Weibo Weng; Mike French, both of Columbus, all of IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/390,615

(22) Filed: Sep. 3, 1999

(51) Int. Cl.$^7$ ...................................... G01F 23/00
(52) U.S. Cl. ..................... 73/299; 73/290 B; 73/302; 367/149
(58) Field of Search ..................... 73/299, 301, 300, 73/302, 290 B, 290 R; 367/149

(56) References Cited

U.S. PATENT DOCUMENTS

| | | | |
|---|---|---|---|
| 3,934,238 | * 1/1976 | Pavlou | 340/239 F |
| 4,026,156 | * 5/1977 | Bowditch et al. | 73/432 |
| 4,291,575 | 9/1981 | Frissora | 73/302 |
| 4,375,764 | * 3/1983 | Lawford et al. | 73/301 |
| 4,504,819 | 3/1985 | Hosoya | 340/60 |
| 4,643,025 | 2/1987 | Stone | 73/302 |
| 4,734,682 | 3/1988 | Bond, Jr. | 340/614 |
| 5,059,954 | 10/1991 | Beldham et al. | 340/614 |
| 5,060,512 | 10/1991 | Kanashige et al. | 73/301 |
| 5,146,783 | 9/1992 | Jansche et al. | 73/301 |
| 5,167,155 | * 12/1992 | Rodgers | 73/299 |
| 5,247,833 | 9/1993 | Sasaya | 73/301 |
| 5,413,404 | 5/1995 | Inagawa | 303/92 |
| 5,656,771 | 8/1997 | Beswick et al. | 73/118.1 |
| 5,856,783 | 1/1999 | Gibb | 340/618 |

* cited by examiner

*Primary Examiner*—Hezron Williams
*Assistant Examiner*—Dennis Loo
(74) *Attorney, Agent, or Firm*—Woodard, Emhardt, Naughton, Moriarty & McNett

(57) ABSTRACT

A continuous liquid level measurement system is disclosed which is based upon a differential pressure measurement. The pressure of the liquid level to be measured is calibrated with a second pressure measurement of the pressure above the liquid in order to get a more accurate pressure measurement which is related in a predetermined manner to the level of the liquid. For instances in which the liquid to be measured is in a harsh environment, the invention provides for a means for mounting the sensitive pressure measurement devices remotely from the liquid.

18 Claims, 3 Drawing Sheets

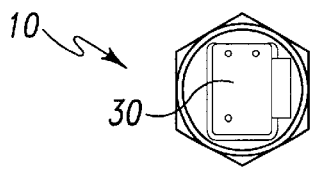
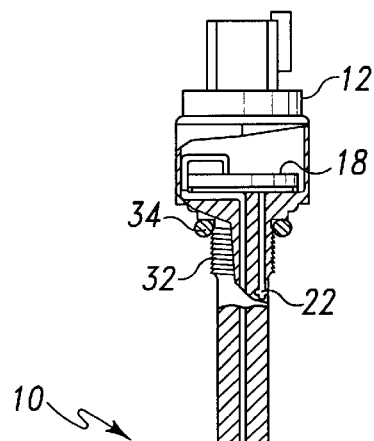
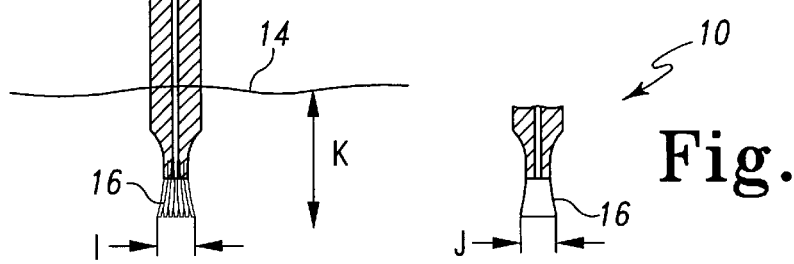
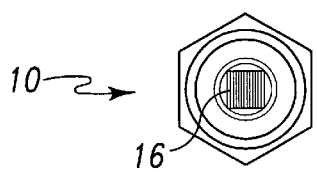

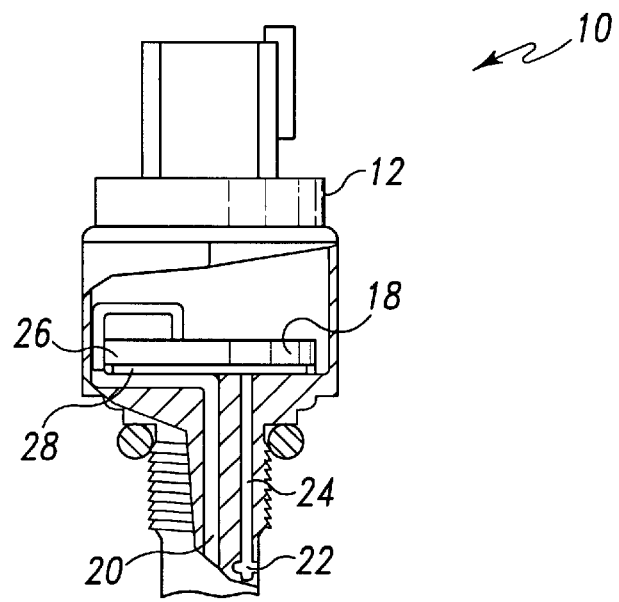
Fig. 2
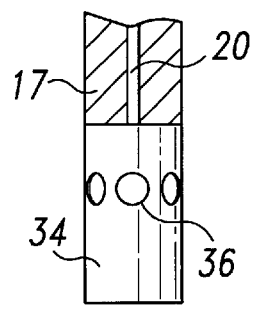 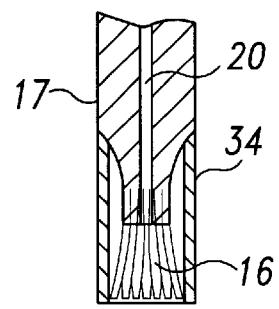
Fig. 3A  Fig. 3B

CONTINUOUS LIQUID LEVEL MEASUREMENT SYSTEM

TECHNICAL FIELD OF THE INVENTION

The present invention generally relates to measurement systems and, more particularly, to a continuous liquid level measurement system.

BACKGROUND OF THE INVENTION

In the field of internal combustion engines, it is often desirable to measure the level of various engine liquid levels, such as engine oil, fuel, coolant, etc. In the case of engine oil, for example, engines are nearly always provided with an oil dipstick which is extended down a tube and into the engine oil pan. By withdrawing the dipstick, the amount of oil in the oil pan may be roughly determined by visually inspecting the distance from the distal end of the dipstick to the uppermost reach of the oil clinging thereto.

This method for measuring oil exhibits several drawbacks. First, the visual measurement is an extremely vague measurement in terms of quantity of oil. In some instances, for example, it is desired to measure the amount of oil consumed by an engine versus time, in a long-term test in which the engine is operated continuously over an extended period. In such instances, a dipstick does not provide satisfactory measurement resolution or repeatability. Also, dipsticks are inconvenient from a measurement time standpoint, such as for use in fleet vehicles where it is desired to measure the oil level on a daily basis.

Attempts have therefore been made in the prior art to provide for automated electronic sensing of fluid levels such as engine oil levels. Such measurements can be problematic due to the harsh environment in which the measurement must be made. For example, the use of capacitive sensors in the oil pan are generally unreliable due to the high soot environment of the engine oil. Furthermore, oil pans experience high vibration levels when the engine is operating, making it difficult to maintain pressure transducer based measurement systems in the oil pan. Also, oil pan durability can be compromised when mounting sensors therein.

Another problem encountered when trying to measure oil level in the oil pan by measuring the pressure exerted by the oil on a pressure sensor is the inaccuracy of such measurements caused by varying head pressure above the oil (caused by blowby gases and the dynamics of the moving engine parts). Varying head pressure can also be a problem in other closed vessels, such as fuel tanks and coolant tanks.

There is therefore a need for an accurate liquid level measurement system that may be read automatically, that avoids reliability problems associated with a harsh measurement environment, and that produces an accurate level measurement, even with varying head pressures. The present invention is directed toward meeting this need.

SUMMARY OF THE INVENTION

A continuous liquid level measurement system is disclosed which is based upon a differential pressure measurement. The pressure of the liquid level to be measured is calibrated with a second pressure measurement of the pressure above the liquid in order to get a more accurate pressure measurement which is related in a predetermined manner to the level of the liquid. For instances in which the liquid to be measured is in a harsh environment, the invention provides for a means for mounting the sensitive pressure measurement devices remotely from the liquid.

In one form of the present invention, a continuous liquid level measurement system is disclosed, comprising a shaft having a proximal end and a distal end; a differential pressure transducer disposed at the proximal end and having a first pressure input and a second pressure input; a flexible bladder disposed at the distal end; a first pressure transmission tube disposed within the shaft and coupling the bladder to the first pressure input for substantial equalization of pressure therebetween; a reference pressure port formed in the shaft proximal of the bladder; and a second pressure transmission tube disposed within the shaft and coupling the reference pressure port to the second pressure input for substantial equalization of pressure therebetween; wherein when the bladder is placed below the liquid level and the reference pressure port is placed above the liquid level, the differential pressure transducer will measure a pressure of the liquid on the bladder, and thus the liquid level.

In another form of the present invention, a continuous liquid level measurement system is disclosed, comprising a shaft having a proximal end and a distal end; a first pressure transducer disposed at the proximal end and having a first pressure input and a first pressure output signal; a second pressure transducer disposed at the proximal end and having a second pressure input and a second pressure output signal; a signal processor coupled to the first and second pressure output signals and operative to produce a difference output signal substantially equal to a difference between the first and second pressure output signals; a flexible bladder disposed at the distal end; a first pressure transmission tube disposed within the shaft and coupling the bladder to the first pressure input for substantial equalization of pressure therebetween; a reference pressure port formed in the shaft proximal of the bladder; and a second pressure transmission tube disposed within the shaft and coupling the reference pressure port to the second pressure input for substantial equalization of pressure therebetween; wherein when the bladder is placed below the liquid level and the reference pressure port is placed above the liquid level, the difference output signal will be proportional to a pressure of the liquid on the bladder, and thus the liquid level.

BRIEF DESCRIPTION OF THE DRAWINGS

FIGS. 1A–D illustrate several views of a preferred embodiment continuous liquid level measurement device of the present invention.

FIG. 2 is a partial cut-away view of a portion of the device of FIG. 1A.

FIG. 3A is a side-elevational view of the distal end of a second embodiment of the present invention.

FIG. 3B is a cross-sectional view of the distal end of FIG. 3A.

DETAILED DESCRIPTION OF THE PREFERRED EMBODIMENTS

Figure 4:
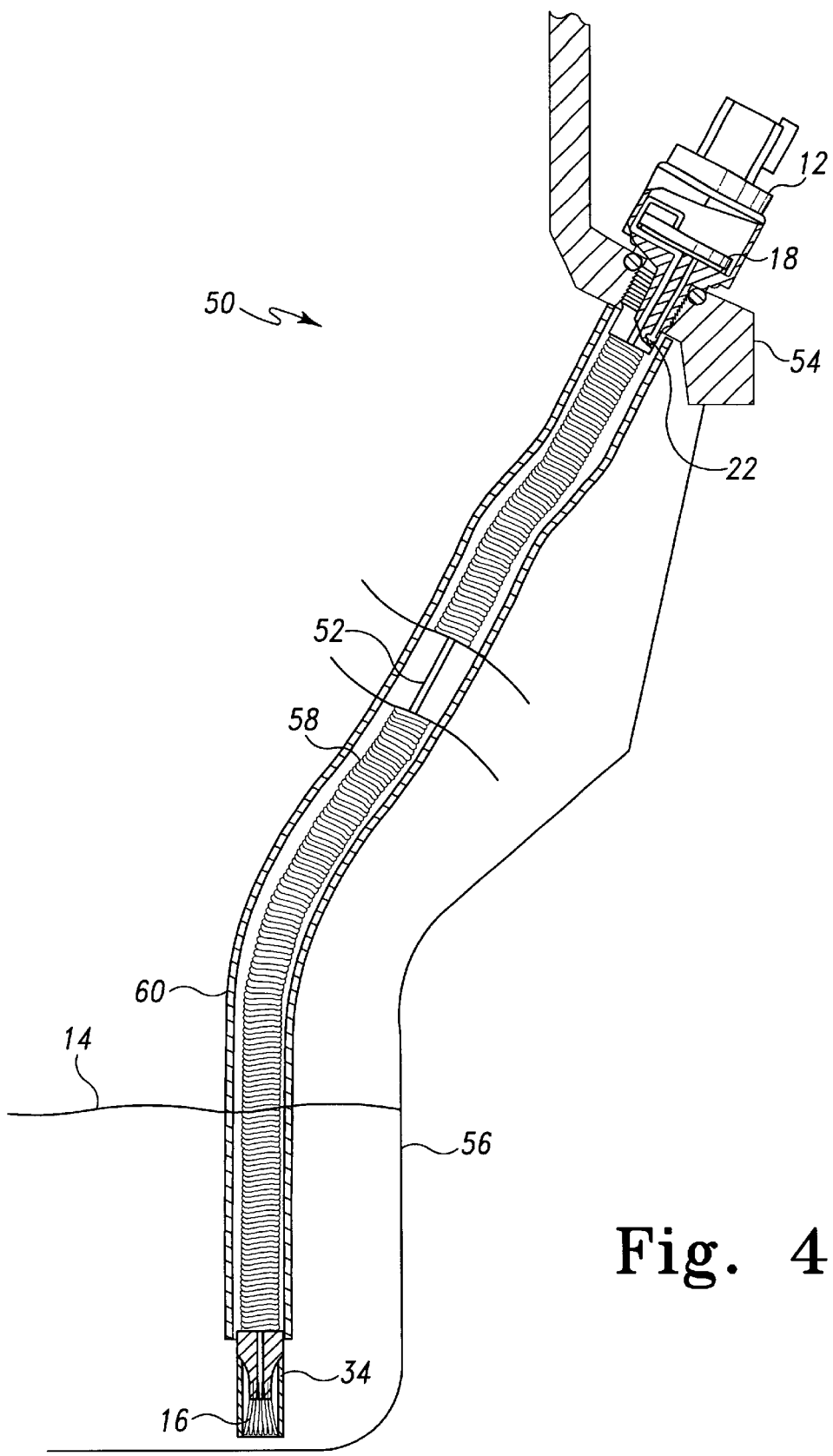
FIG. 4 is a partial cross-sectional view of a third embodiment of the present invention mounted in an engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Using the case of measurement of the level of oil in an engine oil pan as an example, several reasons have been detailed hereinabove as to why it is undesirable to mount a sensitive measurement transducer directly in or through the engine oil pan. Therefore, FIGS. 1A–D and FIG. 2 illustrate a preferred embodiment continuous liquid level measurement system of the present invention, indicated generally at 10. The device 10 is designed to physically isolate the sensitive pressure sensor from the liquid that is being measured, in order to place the pressure sensor in a lower vibration and more convenient mounting position. In the preferred embodiment of the present invention, the device 10 is designed to mount into a dipstick port of an engine, thereby providing a low impact of incorporating the present invention to engine platforms at the design integration stage.

The device 10 incorporates the pressure transducer measurement device at the proximal end 12, which is located remotely from the liquid 14 being measured. A flexible bladder or bellows 16 is provided at the distal end of the device 10 and is designed to extend into the liquid 14 to be measured. A shaft 17 extends between the proximal and distal ends. The bladder 16 is submerged in the liquid 14 to a desired depth to achieve the pressure range suitable for sensing with a pressure transducer 18 incorporated into the device 10. A first pressure transmission tube 20 is provided within the shaft 17 in order to transmit the pressure experienced by the bellows 16 to one side of the pressure transducer 18.

In some applications, the liquid 14 may be subjected to a varying head pressure (as in a closed vessel such as a crankcase, fuel tank, coolant tank, etc.). Therefore, in order to obtain a pressure measurement that accurately represents the liquid 14 level, a differential pressure measurement may be made by the device 10. The differential pressure measurement is made possible by placing a reference pressure port 22 in the shaft 17 at a level above the liquid 14. A second pressure transmission tube 24 transmits the pressure at reference pressure port 22 to a second side of the pressure transducer 18.

The bladder 16 is preferably partially filled with air (or liquid) such that there is no elastic tension exerted by the bladder 16 membrane on the air (or liquid) within it (which would cause the air (or liquid) to be at a different pressure than external pressure). The bladder 16 is preferably made from a compliant material as is known in the art that offers virtually no resistance to forces imposed upon its walls from the exterior (i.e. from the liquid 14). The bladder 16 is volume sized according to the volume of the first pressure transmission tube 20 and the cavity 26 within the pressure transducer 18.

The pressure transducer 18 includes a flexible transducer diaphragm 28 which will flex by varying amounts depending upon the differential pressure on either side of the diaphragm 28. The reference pressure appearing at reference pressure port 22 is applied to a first side of the diaphragm 28, while the pressure exerted upon bladder 16 by the liquid 14 is applied to a second side of the diaphragm 28. The bladder 16, first pressure transmission tube 20 and transducer diaphragm cavity 26 comprise a sealed pressure transmission system, filled to a predetermined volume with air (or liquid). The bladder 16 is preferably designed to compress in one or two dimensions only (I, J) in order to minimize errors due to displacement which may be encountered if displacement is allowed along the height axis K of the fluid level.

In the preferred embodiment, the pressure transducer 18 comprises a differential pressure transducer as is known in the art. The effect of the reference pressure port 22 is to cause flexing of the transducer diaphragm 28 by an amount that is only related to the pressure caused by the liquid level and not by any head pressure existing above the liquid 14. This differential pressure is sensed by the transducer 18 and an electrical signal proportional thereto is supplied to the electrical conductors 30 at the top of the device 10. The pressure transducer output appearing at the pins 30 may be coupled to a separate control or indicator system (not shown) as will be readily appreciated by those having ordinary skill in the art.

The housing at the proximal end 12 of the device 10 preferably includes a threaded surface 32 for mounting the device 10 to the engine block, but may also be a flange mount design or may incorporate any other convenient means for mounting. For applications having a closed vessel with a head pressure, a seal 34, such as an O-ring seal, may be designed into the housing.

It will be appreciated from the above description that the device 10 may be conveniently mounted to a system, such as an engine, in such a manner that the sensitive pressure measuring devices are located remotely from the liquid to be measured. For example, in the application of measuring the oil level in an oil pan, the proximal end 12 of the device 10 may be conveniently mounted to the dipstick port of the engine head, thereby allowing the shaft 17 to extend down into the oil pan in order to place the bellows 16 below the surface of the oil 14. This isolates the pressure transducer 18 from the liquid 14 (and the more severe vibrations of the oil pan environment), making the device 10 design easier while extending its life and durability. Furthermore, no modifications are necessary to the oil pan in order to incorporate the device 10, and normally either no modifications or only minor modifications will be necessary to the dipstick port in order to integrate the device 10 therein.

The preferred embodiment of the present invention described hereinabove may be modified in order to provide different features or to meet different design criteria. For example, in systems that do not experience varying head pressure above the liquid 14 when the measurement is being taken, it is not necessary to provide the reference pressure port 22 in such cases and the pressure transducer 18 may then comprise a standard gauge or absolute pressure measurement device.

In another modification, the flexible bladder 16 may be physically protected by a rigid shroud 34, such as illustrated in FIGS. 3A–B. The shroud may incorporate one or more vent holes 36 therein in order to minimize the holding of trapped air and debris within the shroud 34.

As another option for the present invention, the differential pressure sensing function does not have to performed by a single pressure transducer 18. For example, the main pressure signal provided by the bladder 16 may be coupled to a single gauge or absolute pressure transducer (not shown), while the reference pressure signal may be coupled to a second like transducer. The output signals to the two pressure transducers can then be subtracted by any convenient means (such as by an electronic comparator microprocessor, etc.) in order to create a reference pressure signal.

Another embodiment of the present invention is illustrated in FIG. 4 and indicated generally at 50. The device 50 is very similar to the device 10, except that the bladder 16 may be coupled to the pressure transducer 18 via a flexible pressure transmission tube 52 where installation of the device 50 imposes indirect access to the liquid 14 level to be sensed. For example, the proximal end 12 of the device 50 may be mounted into the head 54 of an engine block at an angle to the oil pan 56. In order to extend the bladder 16 into the liquid 14 in the pan 56, it is necessary to bend the device 50 after insertion through the head 54. Optional features of the device 50 include the provision of a flexible tube or outer spring 58 for rigidity and protection. When using a spring for the tube 58, free rotation of the curved tube 58 is allowed within the guide tube 60 (such as those used with some engine dipstick systems) during the threaded installation and removal of the device 50.

As a further modification to the device 10, the sensor could be mounted in an inverted direction such that the liquid 14 pressure is measured directly at the pressure transducer and the head pressure is measured remotely by the bladder 16 and transmitted to the pressure transducer.

In any of the above configurations, it will be appreciated by those having ordinary skill in the art that the present invention provides an extremely convenient and reliable means for accurately measuring the level of a liquid in a system where there might be constraints upon where the measurement apparatus may be located. The present invention has particular applicability in the measurement in the level of oil in an engine oil pan due to the ease with which the device may be mounted to the engine through an existing or slightly modified dipstick opening.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A continuous liquid level measurement system, comprising:
    a shaft having a proximal end and a distal end;
    a differential pressure transducer disposed at the proximal end and having a first pressure input and a second pressure input;
    a flexible bladder disposed at the distal end;
    a first pressure transmission tube disposed within the shaft and coupling the bladder to the first pressure input for substantial equalization of pressure therebetween;
    a reference pressure port formed in the shaft proximal of the bladder; and
    a second pressure transmission tube disposed within the shaft and coupling the reference pressure port to the second pressure input for substantial equalization of pressure therebetween;
    wherein when the bladder is placed below the liquid level and the reference pressure port is placed above the liquid level, the differential pressure transducer will measure a pressure of the liquid on the bladder, and thus the liquid level.

2. The system of claim 1, wherein the shaft is flexible.

3. The system of claim 2, wherein the shaft comprises a spring.

4. The system of claim 1, further comprising:
    a flexible diaphragm disposed between the first and second pressure inputs.

5. The system of claim 1, further comprising:
    a threaded surface formed on the shaft distal of the differential pressure transducer.

6. The system of claim 5, further comprising:
    a seal disposed between the threaded surface and the differential pressure transducer.

7. The system of claim 1, further comprising:
    a substantially rigid shroud substantially covering the bladder, the shroud including at least one opening therein for pressure communication between the liquid and the bladder.

8. The system of claim 1, wherein the bladder is substantially inflexible in one direction.

9. The system of claim 1, further comprising:
    an internal combustion engine including an engine block and an oil pan coupled thereto;
    wherein the shaft extends through the engine block such that the proximal end is external to the engine block and the bladder extends to the oil pan.

10. A continuous liquid level measurement system, comprising:
    a shaft having a proximal end and a distal end;
    a first pressure transducer disposed at the proximal end and having a first pressure input and a first pressure output signal;
    a second pressure transducer disposed at the proximal end and having a second pressure input and a second pressure output signal;
    a signal processor coupled to the first and second pressure output signals and operative to produce a difference output signal substantially equal to a difference between the first and second pressure output signals;
    a flexible bladder disposed at the distal end;
    a first pressure transmission tube disposed within the shaft and coupling the bladder to the first pressure input for substantial equalization of pressure therebetween;
    a reference pressure port formed in the shaft proximal of the bladder; and
    a second pressure transmission tube disposed within the shaft and coupling the reference pressure port to the second pressure input for substantial equalization of pressure therebetween;
    wherein when the bladder is placed below the liquid level and the reference pressure port is placed above the liquid level, the difference output signal will be proportional to a pressure of the liquid on the bladder, and thus the liquid level.

11. The system of claim 1, wherein the signal processor comprises an electronic comparator.

12. The system of claim 1, wherein the shaft is flexible.

13. The system of claim 12, wherein the shaft comprises a spring.

14. The system of claim 10, further comprising:
    a threaded surface formed on the shaft distal of the first and second pressure transducers.

15. The system of claim 14, further comprising:
    a seal disposed between the threaded surface and the first and second pressure transducers.

16. The system of claim 10, further comprising:
    a substantially rigid shroud substantially covering the bladder, the shroud including at least one opening therein for pressure communication between the liquid and the bladder.

17. The system of claim 10, wherein the bladder is substantially inflexible in one direction.

18. The system of claim 10, further comprising:
    an internal combustion engine including an engine block and an oil pan coupled thereto;
    wherein the shaft extends through the engine block such that the proximal end is external to the engine block and the bladder extends to the oil pan.

* * * * *